United States Patent
Cani et al.

(10) Patent No.: US 10,520,304 B2
(45) Date of Patent: Dec. 31, 2019

(54) CONTACTLESS DISTANCE SENSOR AND METHOD FOR CARRYING OUT A CONTACTLESS DISTANCE MEASUREMENT

(71) Applicant: Datalogic IP Tech, S.r.l., Bologna (IT)

(72) Inventors: Salvatore Valerio Cani, Campobello di Licata (IT); Enrico Lorenzoni, Zola Predosa (IT)

(73) Assignee: Datalogic IP Tech, S.r.l., Bologna (IT)

( * ) Notice: Subject to any disclaimer, the term of this patent is extended or adjusted under 35 U.S.C. 154(b) by 420 days.

(21) Appl. No.: 14/553,650

(22) Filed: Nov. 25, 2014

(65) Prior Publication Data
US 2015/0153169 A1    Jun. 4, 2015

(30) Foreign Application Priority Data
Nov. 26, 2013 (IT) ................ MI2013A1966

(51) Int. Cl.
*G01S 13/00* (2006.01)
*G01B 21/16* (2006.01)
(Continued)

(52) U.S. Cl.
CPC ............ *G01B 21/16* (2013.01); *G01C 3/02* (2013.01); *G01S 7/4808* (2013.01); *G01S 17/10* (2013.01); *G01S 17/50* (2013.01)

(58) Field of Classification Search
USPC .............................. 4/623; 342/118
See application file for complete search history.

(56) References Cited

U.S. PATENT DOCUMENTS 5,546,086 A * 8/1996 Akuzawa ............ B60T 7/22
340/435
5,583,800 A * 12/1996 Mizukoshi ............ G01S 13/60
324/161
(Continued)

FOREIGN PATENT DOCUMENTS

EP    1 347 308 A1    9/2003

OTHER PUBLICATIONS

Written Opinion dated Nov. 26, 2013 for Italian application ITMI20131966.*

(Continued)

*Primary Examiner* — Min Huang
(74) *Attorney, Agent, or Firm* — Cozen O'Connor

(57) ABSTRACT

The present invention relates to a distance sensor suitable for calculating a processed distance of a target object without contact, including: a contactless measuring circuit suitable for emitting an output signal proportional to the distance of said target object for a plurality of time intervals, so as to obtain a plurality of measurements of the distance of said target object without contact; a first processor circuit suitable for processing said output signals coming from said measuring circuit, so as to calculate a first average distance from said target object based on the average of N distance measurements in output coming from said measuring circuit, said N measurements being consecutive in time and including the last distance measurement emitted by said measuring circuit; a second processor circuit suitable for processing said output signals coming from said measuring circuit, so as to calculate a second average distance from said target object based on the average of M distance measurements in output coming from said measuring circuit, said M measurements being a subset of said N measurements with M<N, consecutive in time and including the last distance measurement emitted by said measuring circuit; a first (Continued)

comparator circuit suitable for calculating a first difference between a value function of said first average distance and a value function of said second average distance; and a third processor circuit suitable for comparing said first difference with a first threshold and for emitting in output a processed distance value, said processed distance value being equal to a value function of said first average distance if said first difference is less than or equal to said first threshold, or being equal to a value function of said last distance measurement emitted by said measuring circuit otherwise. Furthermore, the invention relates to an operating method of said sensor.

20 Claims, 4 Drawing Sheets

(51) Int. Cl.
    *G01C 3/02*     (2006.01)
    *G01S 17/10*     (2006.01)
    *G01S 17/50*     (2006.01)
    *G01S 7/48*     (2006.01)

(56) References Cited

U.S. PATENT DOCUMENTS

| | | | | |
|---|---|---|---|---|
| 9,234,767 | B2* | 1/2016 | Matsue | G01C 22/006 |
| 2006/0200903 | A1* | 9/2006 | Rodenbeck | E03C 1/057 |
| | | | | 4/623 |
| 2006/0247685 | A1 | 11/2006 | Bharmi | |
| 2008/0143529 | A1 | 6/2008 | Gauvreau | |
| 2010/0033339 | A1* | 2/2010 | Gurley | G01S 5/14 |
| | | | | 340/686.1 |
| 2010/0188932 | A1* | 7/2010 | Hanks | G01S 7/52004 |
| | | | | 367/140 |
| 2010/0268683 | A1* | 10/2010 | Inoue | G01S 13/524 |
| | | | | 706/54 |
| 2012/0154200 | A1* | 6/2012 | Kajiki | G01S 7/4017 |
| | | | | 342/70 |
| 2013/0050180 | A1* | 2/2013 | Bruemmer | G06K 9/00791 |
| | | | | 345/418 |
| 2013/0117765 | A1* | 5/2013 | Suzuki | G06F 9/4843 |
| | | | | 719/318 |
| 2016/0313364 | A1* | 10/2016 | Kawai | G01P 11/00 |

OTHER PUBLICATIONS

Italian Search Report dated Jul. 23, 2014, for Corresponding Italian Application No. IT MI20131966, 2 pages.
Written Opinion dated Nov. 26, 2013, for Corresponding Italian Application No. ITMI20131966, 8 pages.
Wikipedia, "Moving average," retrieved from https://en.wikipedia.org/w/index.php?title=Moving_average&oldid=582927266 on Jul. 21, 2014, 8 pages.

* cited by examiner

CONTACTLESS DISTANCE SENSOR AND METHOD FOR CARRYING OUT A CONTACTLESS DISTANCE MEASUREMENT

BACKGROUND

Technical Field

The present invention relates to a contactless distance sensor having improved accuracy and precision, in particular in measuring the distance of moving target objects. Furthermore, the invention relates to an operating method of such a sensor.

Description of the Related Art

Devices or sensors for measuring the distance of objects are known as "contactless" when, in order to carry out the aforementioned measurement, there is no physical contact between the object for which it is wished to measure the distance and the sensor. This type of sensor is generally used in various applications from process automation to quality control in test beds, pneumatic cylinders, in engineering, etc. A sub-class of these sensors is called proximity sensors, usually being able to detect the presence of objects in the immediate vicinity of the "sensitive side" of the sensor itself, of course also in this case without there being any actual physical contact.

Distance or proximity sensors can use different measurement principles. In any case, generally, the sensor emits electromagnetic radiation or sound waves that hit the object for which it is wished to measure the distance or presence, and the sensor measure the differences in the return radiation with respect to that emitted. Typical examples of such sensors are sensors based on triangulation, sensors which are based on the Doppler effect, laser rangefinders, capacitive sensors, etc.

In a further type of distance sensor, the measurement of the distance of an object is obtained from the measurement of the time that a given signal takes to reach the object and come back. Such sensors are called Time Of Flight (TOF) sensors. However, the time taken by light to "come back" is not generally measured directly. In general, modulated pulses of light are sent, for example as a sinusoid, and the phase of the light signal sent and the phase of the light signal reflected and detected are both measured. These sensors can be very precise and accurate.

The distance within which distance or proximity sensors are able to detect objects is defined as nominal range (or sensitive field). Some sensors have an adjustment system so as to be able to calibrate the detection distance.

The field of application of distance or proximity sensors can be divided into static measurements, in which the target object of measurement stays still during the entire period of observation, and dynamic measurements, in which the target object can move during the measurement. In both cases, the sensor must provide a response within predetermined time periods. Generically, static measurements can be defined as those measurements the target object of which stays still for times of more than a second, whereas dynamic measurements can be defined as those measurements where the target object stays immobile for much less than one second.

The measurement of moving objects is particularly important in industry. Contactless measuring sensors are frequently used for measurements of target objects moving along the detection trajectory of the measurement or with target objects that are inserted from one side on a plane perpendicular to the measurement trajectory. These application conditions require a sensor that has a fast response time, suitable for quickly detecting the new position and informing the control system to which it is connected.

In fact, by its very nature, the position information of a moving target object is per sé indeterminate, or rather, it is of little use to know precisely the position (and thus the distance) of the target object at a certain instant if it is no longer in the same position at the next instant. Vice-versa it is very useful and desirable to have a highly precise measurement for stationary or slow-moving target objects.

The measurement of moving target objects requires a quick response so that the associated control system can react as quickly as possible. A typical example in the field of logistics are traveling lifts or rack feeders, mobile goods storage systems that, moving along rigid tracks, make it possible to deposit pallets of goods in suitable housings spread along the tracks that make up the automatic store. The measurement sensors are positioned along the trajectory of the rack feeder in order to detect their position along the track and lock them at the housing where the goods are to be deposited. The need to optimize the loading and unloading operations is such that the response speed of the sensor is one of the most important characteristics, but it is equally important to ensure precise positioning in front of the loading bay when it is identified.

In some of the sensors currently on the market, the user—that is whoever uses the sensor—is given the possibility to choose which of the two methods to use, i.e., the user can typically choose between a "precise" mode suitable for stationary or almost-stationary objects, a "medium precision mode", suitable for objects that move slowly or in a limited ranged of distances, and a "fast" mode, with immediate response time, but having little precision, suitable for objects moving about a lot, at the limit that suddenly enter or leave the measurement field.

The user usually is not able to modify the behavior of the sensor, unless by interrupting the measurement and resetting the operating mode.

In order to increase the precision of the measurement in a distance or proximity sensor, it is known in the field of reference to carry out the acquisition of an ever greater number of samples. In other words, it is not just a single measurement of the distance or presence of an object in the sensitive field of the sensor that is carried out, but N of them that are memorized and an average of which will then be taken.

It is known from statistics that the center of the statistical distribution of the measured values represents the mean value, or most probable value of the measurement.

However, the Applicant has noted how this solution is not optimal, in particular for the measurement of moving target objects. For static measurements, for the same processing times of the measurement device, the acquisition of a large number of measurements, as described above, can be sufficient to obtain the required precision, since the precision of the required measurement can be obtained without particular time constraints, simply obtaining a number N of measurements with N sufficiently large. Such a technique is also slow and imprecise for a moving object: for dynamic measurements giving priority to one characteristic could automatically worsen the other and this is often not tolerated; in other words, giving priority to precision makes the device slow, giving priority to response speed, for example emitting the last measurement value acquired in the case of moving objects as an estimation of the distance, makes the device imprecise.

Moreover, the fact that the operating mode of the sensor used to carry out the measurement, for which the output value of the sensor is for example either the average of N measurements, or the last measurement obtained, depends on the choice of the user, can make the measurement inaccurate, in the case of an incorrect choice among the operating modes available or a change in the measurement situation from a stationary object to a moving object, or vice-versa, without the user realizing. Moreover, the fact that the user must make the choice manually requires continuous supervision of the sensor by the user, wasting time and money.

BRIEF SUMMARY

The present invention relates to a contactless measuring sensor of the distance of a target object, and an operating method of such a sensor, suitable for emitting as output a measurement value of processed distance having a relatively high precision and/or relatively quickly.

One of the main objectives of the invention is to provide a distance measuring sensor, and an operating method thereof, capable of auto-adapting to the measurement situation, i.e., able to establish whether it is dealing with the measurement of a target object that is substantially stationary or moving, without manual intervention by the user.

A further objective of the present invention is to provide a distance measuring sensor, and an operating method thereof, which makes it possible to obtain higher precision and/or better response times with respect to the algorithms commonly used, i.e., those based on average filters over a population of samples, minimizing the impact on the processing and consequently response times of the device itself. Greater precision is desired in all operating modes, i.e., both in static measurements and in dynamic measurements (of moving objects), with greater emphasis on the latter.

In the following description, as well as in the claims, by "distance measurement" more generically not only a measurement of the distance of the object from the sensor or from another selected reference point is meant, but also the detection of the presence or absence of the object within a specified interval. In this case, information relating to the distance measurement is substantially binary information of presence or absence.

Furthermore, by the term "distance sensor", we mean a distance sensor as well as a proximity sensor, as well as a light barrier.

As stated, the algorithms commonly used in distance sensors take an average of a plurality of acquired measurement samples, the number of samples always staying the same in each measurement; the average value of the population by definition statistically represents the most stable and therefore most repetitive value. The repeatability of the measurement determines the precision of the instrument. The more N samples are acquired on average, the smaller the mean square deviation (also called standard deviation), and the more precise the instrument will be in accordance with the law of large numbers.

The acquisition of N samples, with high N, on the other hand has the limit of increasing the computational load of the instrument that reacts the more slowly as desired precision (i.e., higher number of N) of the measurement increases.

The sensor and the method according to the invention optimize the required performance for the real needs. In particular, in the case of fixed targets, they provide a measurement the precision of which is the best that can be obtained in all positions of the operating range (sensitive field) of the sensor, and, vice-versa, in the case of moving targets (i.e., the position of which varies over time) they favor the lower response time that can be obtained by the sensor.

The Applicant has realized that, in order to obtain this different precision depending on the operating condition, and without intervention of the user, it is important for the sensor and the method of the invention to include a speed discriminator, i.e., a speed discrimination step, in order to makes it possible to establish whether the target or object for which it is wished to measure the distance is moving during the time period in which the sensor acquires its position for the calculation of the distance or to determine whether or not it is present within a spatial interval. In carrying out this analysis through the speed discriminator, it is preferable to take into account the fluctuations in the measurements of the object or target due to the intrinsic noise present when carrying out the measurement itself.

In other words, the variation in position can be determined during the sampling process of the measurements that contribute to the average, however the method and the sensor of the invention with which it is established that the object is really moving preferably takes into account the noise associated with the measurement itself and more preferably ensures that the target object is not considered to be moving solely due to the presence of fluctuations of the measurement within the standard deviation thereof.

According to a first aspect, the invention relates to a distance sensor suitable for calculating a processed distance of a target object without contact, including:

A contactless measuring circuit suitable for emitting an output signal proportional to the distance of said target object for a plurality of time intervals, so as to obtain a plurality of measurements of the distance of said target object without contact;

a first processor circuit suitable for processing said output signals coming from said measuring circuit, so as to calculate a first average distance from said target object based on the average of N distance measurements in output coming from said measuring circuit, said N measurements being consecutive in time and including the last distance measurement emitted by said measuring circuit;

a second processor circuit suitable for processing said output signals coming from said measuring circuit, so as to calculate a second average distance from said target object based on the average of M distance measurements in output coming from said measuring circuit, said M measurements being a subset of said N measurements with M<N, consecutive in time and including the last distance measurement emitted by said measuring circuit;

a first comparator circuit suitable for calculating a first difference between a value function of said first average distance and a value function of said second average distance;

a third processor circuit suitable for comparing said first difference with a first threshold and for emitting in output a processed distance value, said processed distance value being equal to a value function of said first average distance if said first difference is less than or equal to said first threshold, or being equal to a value function of said last distance measurement emitted by said measuring circuit otherwise.

According to a second aspect, the invention concerns a method for processing a distance measurement of a target object without contact at the k-th time, the method including:

Carrying out for a plurality of successive time intervals, a plurality of distance measurements of said target object;

calculating a first average distance of N distance measurements of said target object, said N measurements following one after the other and including the last measurement carried out at the i-th time;

calculating a second average distance of M distance measurements of said target object, said M measurements being a subset of said N measurements, where M<N, following one after the other and including the last distance measurement carried out at the i-th time;

determining a first difference between a value function of the first average distance and a value function of the second average distance;

comparing said first difference with a first threshold;

emitting in output as processed distance value of said target object a value function of said first average distance if said first difference is less than or equal to a first threshold, or emitting in output as processed distance value a value function of said last distance measurement otherwise.

The sensor according to the invention can be a distance or proximity sensor based on any principle. It has, for example, an emitter and a receiver suitable for emitting and receiving electromagnetic radiation or sound waves at any predetermined wavelength. Generically, the measurement of the distance of the target object is carried out through analysis of the differences between the electromagnetic or sound waves sent to the target object and those returning. Similarly, in the method of the invention, the plurality of distance measurements is carried out through any principle known in the technical field of reference.

The sensor and the method of the invention, at every k-th time, provide a processed, in other words "improved", measurement of the distance of the target object with respect to that which can be obtained with a known sensor in which the measurement is emitted as it is obtained through the preselected measurement technique or processed through known algorithms.

By distance of the target object, we mean either the distance of the target object from the sensor itself or the distance of the target object from a predetermined reference point, which can also be distanced from the sensor itself that carries out the measurement According to the invention, N measurement samples (or in short "measurements") of the distance of the target object are acquired through the preselected measurement technique and an average is taken of them calculating a first average value of the distance measurements provided. The measurement samples, or in short measurements, are obtained according to the operating principle of the sensor itself, i.e., by triangulation in the case of an optical sensor, by detecting a return echo in an ultrasound sensor, performing a calculation of the time delay between emitted and reflected beam in a time-of-flight sensor, and so on.

In order to obtain such N measurements, a contactless measuring circuit, part of the distance sensor of the invention, emits an output signal proportional to the distance of said target object for each k-th time. This output signal proportional to the distance from the target object is hereafter called the distance measurement of said target object obtained without contact.

The N samples $x_1 \ldots x_N$ follow one after the other, i.e., they are in time sequence from the first, the "oldest", to the last, taken at the k-the time ($x_N = x_k = x_{last}$). Therefore, they should be considered for example like an ordered vector of N values in chronological order, in which the last value represents the most recent value.

At the next time k+1, the N measurements a $x_2, \ldots, x_{k+1} = x_{last}$. This does not mean that the value of the number N of measurements remains the same for the measurement carried out at the k-th time and the measurement carried out at the k+1-the time. In a preferred example of the invention, the values of N can be different in carrying out two averages at different time intervals, i.e., a different number of measurements can be used to make the average. In other words N(k), i.e., the value of N depends on the time interval in which the measurement is made. The relationship of this variation is detailed hereafter.

The operating principle of the distance sensors is given as known in the technical field of reference and can be any in the present invention.

The average of the measurement samples is, according to statistical definition, a single numerical value that briefly describes a dataset. There are various types of average and those most commonly used are the three Pythagorean averages (arithmetic, geometric, and harmonic), and the weighted average. In the present invention preferably by average we mean the arithmetic average, i.e.:

$$\mu_N = \frac{1}{N} \sum_{i=1}^{N} x_i$$

where the symbol $\mu_N$ indicates the arithmetic average of N measurements and $x_i$ are the distance measurements of the target object.

However, any average, like for example a weighted average to take into account possible different errors that the different single measurements can have, given by $$\mu_{N,pond} = \sum_{i=1}^{N} \frac{x_i f_i}{fi}$$

where $f_i$ are the weights of each measurement $x_i$, can alternatively be used.

The average of the N measurements is calculated by the first processor circuit of the sensor.

In reality, since the sensor preferably continuously emits a processed measurement signal for every k-th time, i.e., the method of the invention preferably foresees that for every new k-th time interval a new processed measurement value is emitted, it is preferable for the average to be taken at each successive time interval on a different sample of measurements.

In other words, preferably, if at the k-th time N(k) measurements on which to take the average were considered, including the last measurement carried out at the k-th time, at time k+1 then N(k+1) measurements are considered to make the average, and in this case the last distance measurement is the measurement carried out at the k+1-th time. In the case in which N(k)=N(k+1), the first measurement (i.e., the "oldest" measurement) used in the calculation of the average at the k-th time is no longer considered in the calculation of the average at the k+1-th time.

Statistically, the average considered is therefore the truncated average at the k-th time, called mobile average. Given a series of measurements $\{x_t\}$ where t=1, 2, ... k containing the observed values of a variable x from time 1 to time k, with $\theta_i$ the weight to be attributed to the i-th observed value, the mobile average at time k is defined as:

$$\mu_{m,k} = \sum_{i=0}^{N(k)-1} \theta_i x_{k-i}.$$

A mobile average is called simple if the weights $\theta_i$ are all equal to 1/N (in this case it is a normal arithmetic average), i.e., the mobile average at the k-th time is:

$$\mu_{m,k} = \frac{1}{N(k)} \sum_{i=0}^{N(k)-1} x_{k-i}$$

It is an average of a certain amount of data; the term mobile, on the other hand, refers to the fact that only the last measurements are considered.

Preferably, in the present invention, at the k-th time interval, the mobile arithmetic average at the k-th time is considered as first average distance, so that the arithmetic average of the last N(k) measurement carried out by the measuring circuit is carried out.

Preferably, the first average distance of the N values changes at the k+1-th time interval, both due to the new additional value $x_{k+1}$ that is averaged with the set of measurement values on which the average is taken (the average always includes the last measurement carried out), and due to the fact that the same number N could be different (i.e., it could be that in an embodiment N(k)≠N(k+1)).

Hereafter, since every k-th time interval the mobile average coincides with the average, the average symbol is used, omitting the "m" for mobile.

To attribute a value to the number of measurements N on which the average is taken, the following considerations are preferably taken into account by the method and by the sensor of the invention.

It is known that, given a measurement, it is affected by a certain error. Considering a Gaussian distribution of the measurements, the standard deviation is a dispersion index of the experimental measurements, in other words an estimation of the variability of a population of measurements. The standard deviation is one of the ways to express the dispersion of data around a position index, which can be, for example, the expected value or an estimation of the aforementioned expected value, given for example by the aforementioned average.

The standard deviation of a variable x, in the case in object x is the distance measurement, is defined as:

$$\sigma_x = \sqrt{\frac{\sum_{i=1}^{N}(x_i - \langle x \rangle)^2}{N}} \text{ where}$$

$$\mu_N = \langle x \rangle = \frac{1}{N} \sum_{i=1}^{N} x_i$$

is the arithmetic average of N samples defined above.

There are theoretical arguments to alternatively use this second definition:

$$\sigma_x = \sqrt{\frac{\sum_{i=1}^{N}(x_i - \langle x \rangle)^2}{N-1}}$$

This correction to the denominator ensures that the new definition is a little larger than the previous one, thus correcting the tendency of the previous one to underestimate the uncertainty particularly in the case in which there is little data to work with (N small).

In the present invention, either of the two definitions is used.

The attached FIG. 1 shows the (Gaussian) distribution of a plurality of samples of N distance measurements of the target object carried out with the sensor or through the method of the invention, in which the standard deviation—as stated above—indicates the probability, or the confidence range, that a measurement is within a selected range.

In FIG. 1 it can be seen that the Gaussian distribution of a large number of single measurements has, for the same distance, maximum size (maximum standard deviation); the Gaussian distribution of a series of measurements averaged over a few samples (M) has greater precision; the distribution of a series of measurements each averaged over many samples (N with N>M) has greater precision (smaller standard deviation). FIG. 1 represents measurements having a value in arbitrary measurement units just to display the difference of the distribution as the number of measurements taken into consideration varies.

Therefore, an accurate distance measurement of a target object can be obtained through an average over a value of N samples, with high N (small standard deviation). Of course, the number N of measurements cannot be as big as one wishes because the response times of the sensor and of the method of the invention would be too long, and therefore a compromise must be made in any case between response time and precision of the measurement. Therefore an $N_{max}$ of measurements that can be used is preferably set.

Preferably, it is not wished to provide as output a value with "any" standard deviation, but a target standard deviation value $\sigma_T$ to be obtain is set, which is the maximum acceptable standard deviation. Preferably, setting the maximum value of the standard deviation also determines the minimum number of measurements on which to take the average. The number of measurements N on which to take the average is therefore selected as greater than or equal to this minimum number, more preferably remaining within $N_{max}$.

However, the Applicant has observed that emitting as output of the sensor or of the method of the invention as value of the processed distance this average calculated over N samples is not always the best solution.

The response time of the sensor, excluding the typical operativity times, is essentially equal to the sampling time of the last sample acquired in terms of time, averaged with the mobile average of the N−1 previous samples; such a response time substantially depends on the intrinsic processing time of the electronics. In the case in which the target object is substantially stationary, this average over N samples is the best result in terms of standard deviation and response times (better standard deviation at the shortest response time), i.e., in terms of accuracy and response time.

However, if the target object is moving, the mobile average mechanism acts like an "integral filter" delaying the actual response of the sensor by a time proportional to the number of samples present in the vector that combine to determine the target standard deviation (in the worst case, for target moving over a long distance it is equal to $T_{response,\ max\ distance} \times N_{max}$ samples).

In other words, if a mobile average is used over N samples, but the object is moving quickly towards a new position, the new position will in the worst case be measured with precision equal to the initial one only after N measurements, i.e., when the effect on the average of the last measurement carried out at the previous distance will have vanished because only measurements at the new distance are used to calculate the average. If then the object continues to move, the measurement continuously carries along an average value calculated over measurements carried out at different distances and therefore a value with target standard deviation is substantially unattainable. Therefore, in the case of a moving object, the average of N measurements has a high error.

According to the invention, on the other hand, once the condition of moving target object has been determined, the sensor and the method do not consider the mobile average over N samples as value of the processed measurement of the distance to be emitted in output, but the processed distance value that is provided by the sensor and by the method of the invention in the case of a moving target object is the last acquired measurement value. In this way, the target object is followed with a response time equal to the single sampling, actually optimizing the speed to follow it.

In order to determine whether the target object is moving or not, and thus determine whether the measurement of processed distance in output from the sensor or from the method of the invention as "best estimation" of the distance measurement of the target object must be the average over N samples or the last distance value measured, two average distances are calculated.

The first average distance is the average described above over N measurement samples following one after the other and including the last distance measurement taken at the moment when the average itself is taken. A second average distance is calculated over a subset of these N values, i.e., an average of M measurements is calculated, with M<N, in which the M measurements are consecutive in time and including the last measurement carried out.

Preferably, the value of M remains fixed for all of the measurements, i.e., it does not depend on variables such as the error of the measurements themselves, but is constant, so that it always remains the same number in all of the time intervals in which the measurement is carried out.

This second average distance over M measurements, with M<N and including the last distance measurement, is calculated for example by a second processor circuit.

The first and the second processor circuit can also coincide, in a preferred embodiment, i.e., they can be the same single processor circuit like for example an integrated circuit.

Through a comparison of the first and second average distance, or of a function of the first and of the second average distance, one with a relatively small number of samples M and one with a relatively large number of samples N, the first a subset of the second, it is established by the sensor and by the method of the invention whether the target object can be defined as stationary or not.

Advantageously, the comparison is carried out through a first comparator circuit. The first comparator circuit can be part of the first and/or second processor circuit, or outside of them.

Using the symbol $\mu_M$ to define the average distance of M measurements and using the symbol $\mu_N$ to define the average distance of N measurements (as stated, although this symbol has been used above to indicate the arithmetic average, in the invention the average can be of any type), where the M measurements are a subset of the N measurements, from the comparator circuit belonging to the sensor and in a step of the method of the invention the following comparison is therefore carried out:

$$|f(\mu_M) - g(\mu_N)|$$

where f and g are arbitrary functions of the second and first average distance, respectively.

In a preferred example, the comparison carried out is the following:

$$|\mu_M - \mu_N|.$$

From the value of the result of the comparison, i.e., from the calculated difference between the two functions of the two averages (functions that can also be the unitary function and therefore the difference is no other than the modulus of the difference between the two average values), the sensor and the method of the invention establish whether the target object is moving or not.

In detail, a first threshold values is set, indicated with DL1, and in the case in which $$|f(\mu_M) - g(\mu_N)| > DL1 \qquad (1)$$

then the target object is considered to be moving and therefore the value in output from the sensor and from the method of the invention as best estimation of the distance of the target object at the k-th time is given by a function of the last value measured $x_{last}$, last defined in terms of time, i.e., a function of the last measurement carried out.

The comparison of the first difference with the first threshold and the output of the sensor is carried out by the third processor circuit.

Using $d_{processed}$ to indicate the processed distance value in output from the sensor or from the method of the invention, thus gives:

$$|f(\mu_M) - g(\mu_N)| > DL1 \Rightarrow d_{processed} = h(x_{last}) \qquad (2)$$

where h is a function of the last measurement carried out.

Preferably $$|f(\mu_M) - g(\mu_N)| > DL1 \Rightarrow d_{processed} = x_{last}.$$

Even more preferably $$|\mu_M - \mu_N| > DL1 \Rightarrow d_{processed} = x_{last}.$$

If, on the other hand $$|f(\mu_M) - g(\mu_N)| \leq DL1 \qquad (3)$$

then the target object is considered substantially stationary and therefore the value in output from the sensor and from the method of the invention as best estimation of the distance of the target object at the k-th time is given by the first average distance over N distance measurements.

Using $d_{processed}$ to indicate the processed distance value in output from the sensor or from the method of the invention, thus gives:

$$|f(\mu_M) - g(\mu_N)| \leq DL1 \Rightarrow d_{processed} = l(\mu_N) \qquad (4)$$

where l is a function of the average of the N consecutive measurement samples.

Preferably $$|f(\mu_M) - g(\mu_N)| \leq DL1 \Rightarrow d_{processed} = \mu_N.$$

More preferably $$|\mu_M - \mu_N| \leq DL1 \Rightarrow d_{processed} = \mu_N.$$

Thus by selecting a suitable interval DL1, the sensor and the method of the invention at each k-th time interval automatically establish whether the target object is moving or stationary and emit as processed distance value, that is as best estimation of the distance of the target object, either the first average distance over N measurements in the case in which the object is considered to be stationary, or the last measured distance value if the object is considered to be moving.

In one or both of the aspects, the invention can also include, alternatively or in combination, one or more of the following characteristics.

Preferably, according to the first aspect, the sensor includes a memory suitable for memorizing at least $N_{max}$, where $N_{max} \geq N$, of said measurements in output from said measuring circuit after one another in time.

As stated above, preferably a maximum number $N_{max}$ of measurements is established over which the average can be taken, even if the standard deviation remains bigger than the target standard deviation, so as to not excessively increase the response time of the sensor and of the method of the invention.

More preferably, said memory is a memory of the Last-In-First-Out (LIFO) type.

In this advantageous embodiment, the values of the measurements are saved consecutively in a memory, more preferably of the LIFO type, so that they can be used at any moment for the calculation of the first or second average. In other words, one or more of the processor circuits of the sensor cyclically takes care of filling the memory, comparable to a measurement vector $V=\{x_1 \ldots x_{last}\}$ including $N_{max}$ elements where x are the measurements and $x_{last}$ corresponds to the last measurement carried out in chronological order, with the LIFO rule, (last in, first out, the last sample acquired stays at the top of the memory, the first one leaves the memory) and calculates the averages of two distinct groups, one with M values and one with N values, with $M < N \leq N_{max}$.

In a preferred example of the first aspect, the sensor includes:
  a second comparator circuit suitable for calculating a second difference between a value function of said second average distance and a value function of said last distance measurement if said first difference is greater than said first threshold.

In a preferred example of the second aspect, the method includes:
  calculating a second difference between a value function of said second average distance and a value function of said last distance measurement, if said first difference is greater than said first threshold.

In other words, in an advantageous embodiment, the possibilities of motion of the target object for which it is wished to measure the distance are further distinguished.

In fact, in the case in which the difference in absolute value between the two averages at N and M values is "great", i.e., more than DL1, it means that the average at M measurements differs significantly from that at N measurements and seemingly therefore the target object has moved (the average M includes only the "most recent" values with respect to the average over N values). However, this effect, instead of a real movement, could be a statistical fluctuation, and therefore through the sensor and the method of the invention it is checked whether the target object has actually moved by a very high value. This very high value is identified through the calculation of a second difference, equal to:

$$|q(\mu_M) - r(x_{last})|$$

where q and r are arbitrary functions of the second average distance and of the last distance measurement carried out in chronological order.

In a preferred example, the comparison that is carried out is as follows:

$$|\mu_M - x_{last}|.$$

This comparison is preferably carried out by a second comparing circuit. The first and second comparing circuit can be part of the same single circuit.

More preferably, in said first aspect, said third processor circuit is suitable for comparing said second difference with a second threshold and is suitable for emitting in output a processed distance value equal to a value function of said last distance measurement if said second difference is greater than said second threshold, said second threshold being greater than said first threshold, and for erasing said values of N distance measurements stored in said memory.

More preferably, in said second aspect, the method comprises:
  Storing at least N distance measurements consecutive in time;
  comparing said second difference with a second threshold;
  emitting in output as processed distance value of said target object a value function of said last distance measurement if said second difference is greater than said second threshold, said second threshold being greater than said first threshold; and
  erasing said N distance measurements stored.

Therefore, in this embodiment, in the case in which $|q(\mu_M) - r(x_{last})|$ exceeds a second threshold, which is indicated hereafter as DL2, where DL2>DL1, this very probably indicates a clear movement of the target object, highly unlikely to be the result of a statistical fluctuation, which moves into a very different position from the initial one; this case corresponds to many industrial applications, in which the target object self-propelled along the measuring trajectory or enters perpendicularly to it.

In this case not only is the last measured value emitted as processed distance value, but the memory of the N distance measurements is also erased, i.e., the vector of the measurements $V=\{x_1 \ldots x_{last}\}$ is erased so as to obtain is $V=\{empty\}$, so as to erase any reference to a distance that is no longer up to date. The mobile average is zeroed and the last sampled distance measurement is provided in output in the shortest time possible.

In short, in an embodiment:

$$|f(\mu_M) - g(\mu_N)| > DL1 \& |q(\mu_M) - r(x_{last})| > DL2$$
$$\Rightarrow d_{processed} = h(x_{last}) \& V = \{empty\}. \quad (5)$$

More preferably, $$|f(\mu_M) - g(\mu_N)| > DL1 \& |q(\mu_M) - r(x_{last})| > DL2$$
$$\Rightarrow d_{processed} = x_{last} \& V = \{empty\}.$$

Even more preferably:

$$|\mu_M - \mu_N| > DL1 \& |\mu_M - x_{last}| > DL2$$
$$\Rightarrow d_{processed} = x_{last} \& V = \{empty\}.$$

Alternatively, in a preferred example of the first aspect, said third processor circuit is suitable for comparing said second difference with a second threshold and for emitting in output a processed distance value equal to a value function of said last distance measurement if said first difference is greater than said first threshold and said second difference is less than or equal to said second threshold, said second threshold being greater than said first threshold, and for keeping said N measurements stored in said memory unchanged.

Alternatively, in a preferred example of the second aspect, the method includes:

Storing at least N distance measurements consecutive in time;

comparing said second difference with a second threshold;

emitting in output as processed distance of said target object a value function of said last distance measurement if said first difference is greater than said first threshold and said second difference is less than or equal to said second threshold, said second threshold being greater than said first threshold, and keeping said values of N distance measurements stored unchanged.

Differently from the embodiment in which the equation (5) is satisfied, here the last distance measurement does not differ "excessively" from the average over M values. Therefore $|q(\mu_M)-r(x_{last})|$ is less than DL2. This, as stated earlier, may mean that a statistical event has led to the divergence of the second average distance with respect to the first average distance of more than DL1, and not necessarily a movement of the object.

In this case in which the second difference is below the second threshold, preferably the sensor and the method of the invention continue to emit as processed distance value the last measured distance value, however the measurements present in the memory, more preferably in the memory vector, are not erased since they can be used again in the case in which, at the k+1-th time or even afterwards, the equation (3) is satisfied again. In this way, there is no need to restart the acquisition process of the measurements from zero, in the case in which the exceeding of the threshold DL1 was just a statistical fluctuation and the target object is in reality stationary, but the information of the previous measurements stays in the memory, thus being able to increase the precision of the subsequent distance averages with respect to the case in which the memory is erased, if the equation (3) applies again.

In short, in a preferred example $$|f(\mu_M)-g(\mu_N)|>DL1 \& |q(\mu_M)-r(x_{last})|\leq DL2$$
$$\Rightarrow d_{processed}=h(x_{last}) \& V=\{\text{unchanged}\}. \quad (6)$$

More preferably, $$|f(\mu_M)-g(\mu_N)|>DL1 \& |q(\mu_M)-r(x_{last})|\leq DL2$$
$$\Rightarrow d_{processed}=x_{last} \& V=\{\text{unchanged}\}.$$

Even more preferably:

$$|\mu_M-\mu_N|>DL1 \& |\mu_M-x_{last}|\leq DL2$$
$$\Rightarrow d_{processed}=x_{last} \& V=\{\text{unchanged}\}.$$

In an advantageous embodiment, said first threshold value and/or said second threshold value is a function of a standard deviation of said first and/or second average distance.

The first threshold value DL1 is preferably selected so that there is reliability within a predetermined percentage that the target object for which it is wished to determine the distance remains almost stationary. In other words, if the difference between the first and the second average distance, or the difference between a function of the first average distance and a function of the second average distance, remain within the interval DL1 in modulus it means that the target object is substantially stationary with a predetermined percentage.

In order to do this, in a preferred embodiment, the value of the first threshold is correlated to the value of the standard deviation of the measurements.

For example, preferably, it is wished for the predetermined percentage to be around 95%, however any other value can be used in the present invention, according to the field of application in which a greater or smaller error can be tolerated.

Therefore, from the theory of probabilities, it is known that the probability of a measurement x, in this case of distance, falling within the range $\mu \pm 2\sigma$, where $\mu$ is the average over a certain number of measurements, is equal to about 95%.

Although the size of DL1 can be selected with any criterion suitable for the application, without the general method being altered by it, the size of DL1 nevertheless is preferably minimal, so that the accuracy is high. However, at the same time, it is wished for the maximum number of measurements to fall within DL1 (with the target stationary), for example as stated above equal to 95% but this percentage can be modified according to the application. Since the condition $|\mu_M-\mu_N|>DL1$ requires the calculation of the values $\mu_M$ and $\mu_N$, each of which is characterized, respectively, by $\sigma_M$ and $\sigma_N$ with respect to the center of the statistical distribution, it follows that $2\sigma_M+3\sigma_N$ describes the specific case (worse case) in which the modulus $|\mu_M-\mu_N|$ reaches the maximum value at a confidence range of 95% around the center of the statistical distribution.

In other words, in a preferred example there is:

$$DL1=2\sigma_M+3\sigma_N.$$

With $$\sigma_M = \frac{\sigma}{\sqrt{M}} \text{ and } \sigma_N = \frac{\sigma}{\sqrt{N}},$$

where $\sigma$ is the standard deviation of a population of single distance measurements, gives $$\frac{\sigma_M}{\sigma_N} = \sqrt{\frac{N}{M}},$$

implying $$\sigma_M = \sqrt{\frac{N}{M}} \sigma_N$$

The equation of DL1 given above, is $$DL1=2\sigma_M+3\sigma_N=2\sigma_N\sqrt{N/M}+3\sigma_N \approx 2\sigma_N\sqrt{N/M}+K \quad (7)$$

The last equality is due to the fact that in the "worst" case the two populations of measurements, at N and M components, used to calculate the first and the second average could be totally uncorrelated; in reality a correlation does exist, due to the fact that the samples M and N are the first a subset of the second and therefore belong to the same population. This correlation ensures that the term $3\sigma_N$ is overestimated and in reality a lower value should be set. The Applicant has found that preferably such a value can be estimated with a constant value K, in this case with K constant empirical correction factor, $<3\sigma_N$.

The first threshold DL1 can be high or low, according to the desired percentage, however it is considered that 95% is a preferred value for the application.

Therefore DL1 is the interval in which the target object is considered to be stationary, with a predetermined probability; in this interval the first average distance $\mu_N$, or a function of the first average distance, is provided as processed distance measurement $d_{processed}$, where N is the number of measurements used on average and preferably such that $\sigma_N < \sigma_T$, obtaining better repeatability, at the expense of promptness with respect to not calculating any average and providing the last measurement carried out as result.

In an example, DL1 can therefore be considered as the interval in which the target object is considered to be stationary 95% of the time. Statistically it is possible for 5% of the distance measurements to be outside of this interval even if the target object is not moving.

In a preferred example, the second threshold DL2 is introduced precisely to differentiate the case in which the difference between the first and the second average distance exceeds the first threshold DL1 because the object is really moving or not. If this exceeding of DL1 is due to statistical fluctuations, i.e., in 5% of the cases discussed above in the case in which 95% is set as the probability in the definition of DL1, the data of repeatability of the subsequent measurements is not jeopardized since the memory, i.e., the vector of the mobile average, is not zeroed. Therefore, whether or not the second threshold DL2 is exceeded implies that the exceeding of the first threshold DL1 is or is not due to statistical fluctuations (again in a probabilistic manner); regarding this see equations (7) and (8).

In the same way, preferably, the second threshold DL2 is also defined as a function of the standard deviation of the first and/or of the second average distance, establishing a priori a probability for which a distance measurement value outside of such a range given by the second threshold DL2 is a moving object with a set probability.

In a preferred example $$DL2 = 4*DL1. \quad (8)$$

Advantageously, said first threshold value and/or said second threshold value is a function of the distance of said target object.

Advantageously, in the second aspect, the method includes:

Varying said first and/or said second threshold as a function of said distance.

Since the first and the second threshold are preferably set so as to give a "probability" measurement that the target object is in motion or stationary, and this probability changes with the distance, preferably also the first and the second threshold change with the distance.

The standard deviation is a function of the distance, since it is correlated to the ratio/noise signal of the receiving chain.

From experimental tests on measurement sensors, the value of the standard deviation increases proportionally to the square of the distance of the target object to be measured, and consequently in the calculation of the first average preferably N measurements are used with "high" N preferably at the maximum distance of the target from the measuring sensor.

A typical trend of the standard deviation as a function of the distance of the target object is given as an example in FIG. 3.

The fact that the standard deviation depends on the distance implies that in a preferred embodiment of the invention, in which the first and/or second threshold are also functions of the standard deviation, in turn they also depend on the distance.

The equations (7) and (8) therefore become:

$$DL1(d) \cong 2\sigma_N(d)\sqrt{N/M} + K, e$$

$$DL2(d) = 4*DL1(d).$$

Preferably, said sensor is a time-of-flight sensor.

The Applicant has analyzed the known sensors and has determined that those based on the measurement of time of flight are the recommended sensors, preferably, for the present application, in particular due to the accuracy that they ensure in the range of values of the distances generally required in which the detection of the target object has to be made.

Preferably, according to the first aspect, the sensor comprises an integrated circuit including said first and/or second and/or third processor circuit.

More preferably, according to the first aspect, the sensor comprises an integrated circuit including said first and second and third processor circuit.

Even more preferably, according to the first aspect, the sensor comprises an integrated circuit including said first and second comparator circuit.

For example, there is a single microprocessor that operates for all three processor circuits as well as for the two comparators. In other words, in a preferred embodiment, all of the operations are carried out by a single microprocessor, for example the third processor. In a particularly preferred example, apart from the digitalization of the native signal of the sensor circuit, which is carried out by an analogue chain, all the rest, i.e., the calculation of the time of flight in the case of a time of flight sensor and all of the measuring operations, are carried out in a single component, which is a microprocessor or even more preferably a FPGA (field programmable gate array) that performs its functions.

In order to limit the costs of the sensor, according to the invention it is preferred to integrate as many components as possible in a single integrated circuit, even more preferably in a single ASIC (application specific integrated circuit).

Preferably, according to the first aspect, said first or said third processor circuit is suitable for calculating a standard deviation of said first average distance and for comparing said standard deviation of said first average distance with a standard deviation target, a value of said number N being selected so that said standard deviation of said first average distance is less than or equal to said standard deviation target.

Preferably, according to said second aspect, the method of the invention includes:

Pre-setting a standard deviation target value of said first average distance of N distance measurements;

selecting a value of the number of measurements N so as to obtain a value of a standard deviation of said first average distance equal to or less than said standard deviation target.

Advantageously, the number of measurements N in which the average is taken is not always equal to $N_{max}$, but generally is less, so as to provide in output a processed distance value that is as accurate as possible in the shortest time possible. So as to ensure this accuracy in a short time, a standard deviation target value is set for the first average over N measurements. Said standard deviation target substantially represents the error that is considered acceptable for the first average, which as seen can be an output value of the sensor (=processed distance) or of the method of the invention, in the case in which the target object can be considered substantially stationary. The average of the values, therefore, at each successive acquisition of a measurement, is computed by adding the last measurement itself until its standard deviation is equal to or less than the standard deviation target and thus the measurement is possibly emitted.

The fact that the standard deviation depends on the distance implies that preferably, the greater the distance of the target object, the greater the value of N.

Preferably, the number of measurements N is set at its maximum value $N_{max}$ when the sensor is working at the maximum distance or close to it; however, if the object is detected stationary (average over a few samples M remains stable) and the distance is less (e.g., near field or intermediate field), the number N is set at a value lower than $N_{max}$, provided that it is such as to keep the desired standard deviation).

Preferably, it is possible to use the formula: $N(d)=[\sigma(d)/\sigma_T]^2$

In an embodiment, according to the second aspect, the method includes:

Updating the values of said first and second average distance, of said first and second difference and of said processed distance at the time interval k+1 after the time interval k.

In other words, preferably the processed distance value is emitted not just once, but in a sequence of time intervals, therefore at the next time interval k+1, a new distance measurement value is saved inside the memory and a new first average distance of N distance measurements and a new second average distance of M distance measurements, both including this new k+1-th distance value, are calculated, just as a new difference is calculated that is compared to a new first threshold so as to give a new value for the processed distance measurement.

In fact, since the standard deviation depends on the distance, the values of DL1 and DL2 will also depend on the distance.

BRIEF DESCRIPTION OF THE DRAWINGS

These and further advantages of the invention will become clearer from a detailed description thereof with reference to the attached drawings, in which.

DETAILED DESCRIPTION

Figure 2:
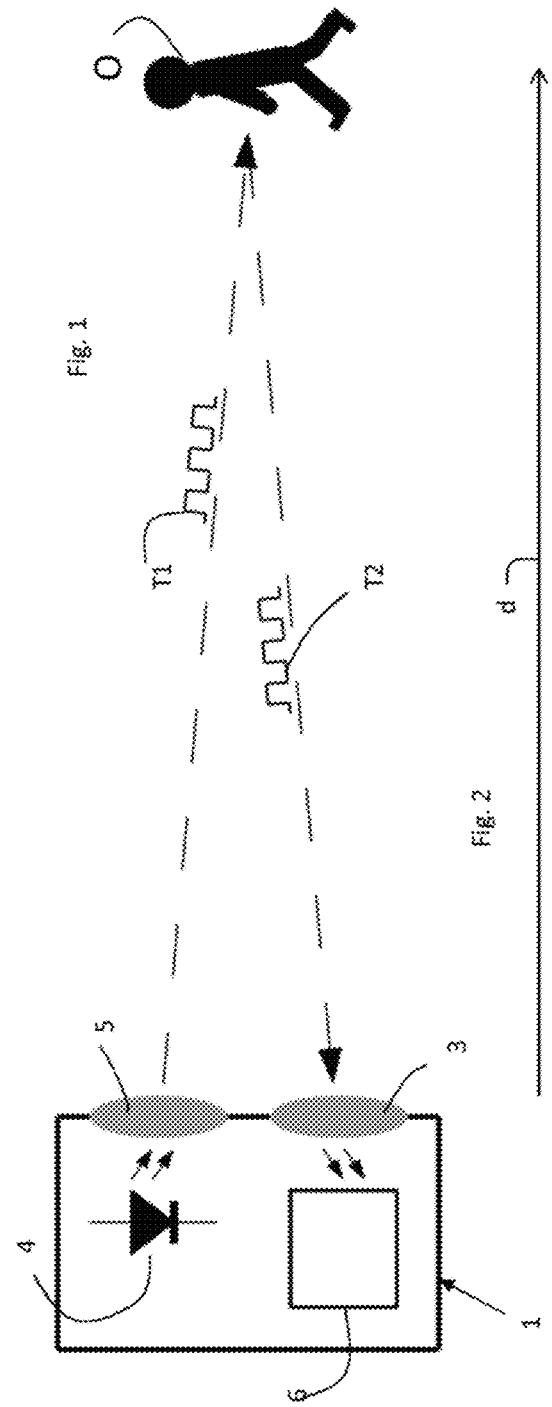
FIG. 2 is a simplified representation of the operating principle of the sensor according to the present invention.
Figure 8:
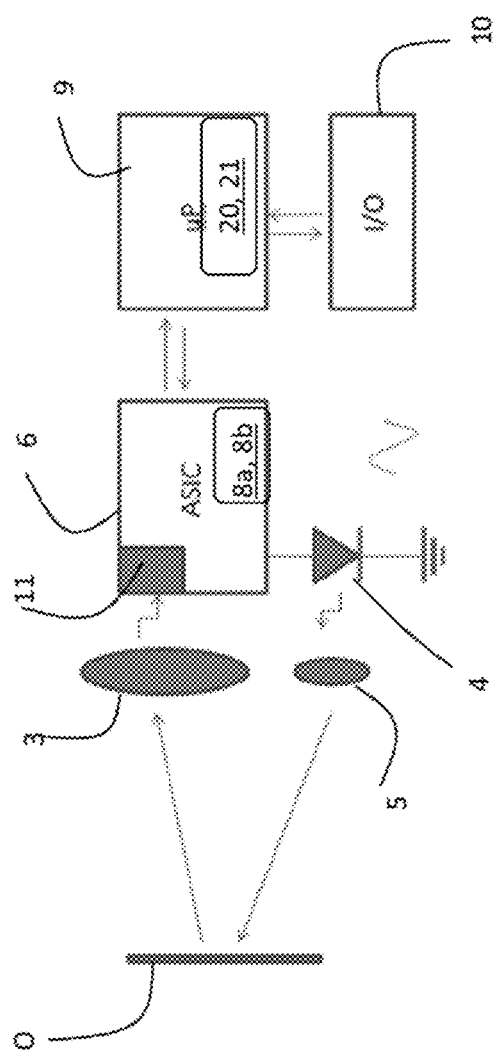
FIG. 8 is an example diagram of a preferred example of a sensor made in accordance with the present invention.

Initially with reference to FIGS. 2 and 8, reference numeral 1 globally indicates a sensor for measuring a processed distance made in accordance with the present invention.

The distance sensor 1 is suitable for calculating the distance of a target object O that enters into the vicinity of the sensor 1, the vicinity being the field of action, or sensitive field, of the sensor 1. The calculation of the distance of the target object O is carried out through any technique known in the field of reference that does not comprise physical contact between the sensor and the target object. Hereafter, as an example a sensor 1 is described using the time of flight technique (TOF) that is based for example on a calculation of the time delay between a train of pulses sent towards the target object O and one received by the sensor 1 reflected by the target object O. However, any different measuring technique, provided that it is without contact, can be used.

The sensor 1, preferably, includes an emitter of electromagnetic radiation 4 suitable for emitting a train of light pulses T1 (see FIG. 2). In the case in which the target object O is along the optical path of the train of pulses emitted T1, a part of the train of pulses is reflected generating a reflected train of pulses T2 directed back towards the sensor 1.

Preferably, the sensor 1 includes a first optical group 5 positioned in front of the emitter 4. The optical group 5 is suitable for making the train of pulses T1 emitted by the emitter 4 collimated or focused. Furthermore, the optical group 5 can be used to make the radiation of many emitters, if present, uniform or to correct possible distortions of the radiation emitted by the emitter.

The sensor 1 also includes a receiver of electromagnetic radiation 6 suitable for receiving the reflected train of pulses T2 from the object O.

In front of the radiation receiver 6, there is preferably a further optical group 3, suitable for collecting and focusing the electromagnetic radiation reflected by the object O towards the receiver 6.

Preferably, the sensor 1 includes a measuring circuit 11 and a first and a second processor circuit of the signal 8a, 8b. More preferably, the sensor 1 includes an integrated circuit, which in turn comprises the receiver of electromagnetic radiation 6, the first measuring circuit 11 as well as the first and the second processor circuit of the signal 8a,8b mounted monolithically on it.

The measuring circuit 11 is suitable for emitting output signals proportional to the distance d between the target object O and the sensor, or between the target object and a predetermined reference point. In FIG. 2 the distance between the sensor 1 and the target object O is indicated with d. In other words, in output from the circuit 11 measurements of the distance d of the target object O are obtained. These measurements are indicated with $x_k$ where k represents the measurement at the k-th time interval (or, in short, time).

A third processor circuit, for example a microcontroller or microprocessor 9, processes the output signals coming from the first and from the second processor circuit 8a, 8b. The communication between first/second processor circuit 8a,8b and the third processor circuit 9 takes place for example, but not exclusively or necessarily, through a serial port.

The sensor 1 further comprises a first and a second comparator circuit 20, 21, which can in the illustrated example of FIG. 8 be part of the third processor circuit 9, suitable for comparing the numerical values, as better detailed hereafter.

The operation of the sensor 1 is not exemplified with reference to FIGS. 4 to 7.

In an optional step, the start of the measurement and the insertion of possible parameters for the optimal operation of the sensor takes place by command of the third processor circuit 9, which in turn is connected to an input/output device or peripheral 10 through which the user or another computer can introduce the desired parameters relative to the measurement that depend on the actual localization and use of the sensor 1.

At each k-th time a measurement $x_k$ of distance d of the object O is emitted by the measuring circuit 11. The distance measurement d is preferably stored, for example in a memory 15 visible only in FIG. 4. The memory 15 is more preferably a LIFO memory and can store at least a number equal to N measurements.

The value of the number N of measurements is preferably set based on the standard deviation value that is wished to be obtained (standard deviation target $\sigma_T$), in particular based on the standard deviation value that is wished to be obtained for an average of the N measurements. All other things being equal, the greater the value of N, the lower the standard deviation.

Therefore, having set the desired standard deviation target, the value of the number N is selected. An example of N can be a few tens of measurements.

Figure 3:
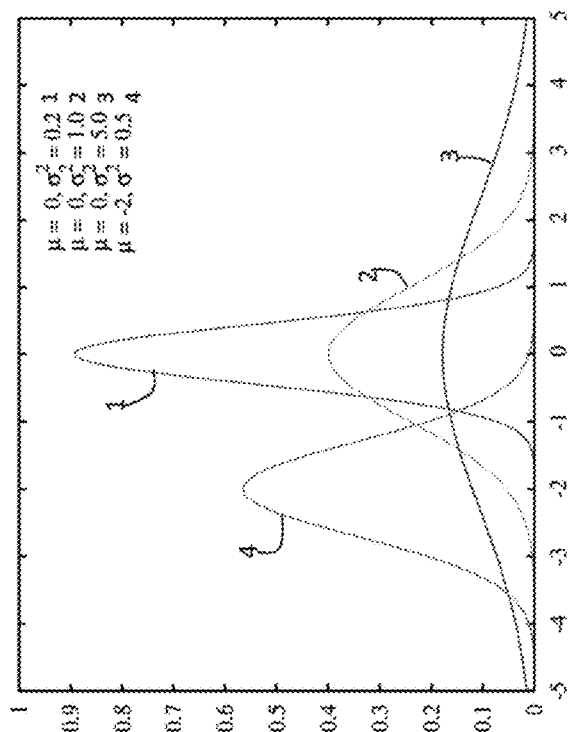
FIG. 3 is a graph relating to an empirical trend of the standard deviation as a function of the distance of a target object based on experimental data.
Figure 1:
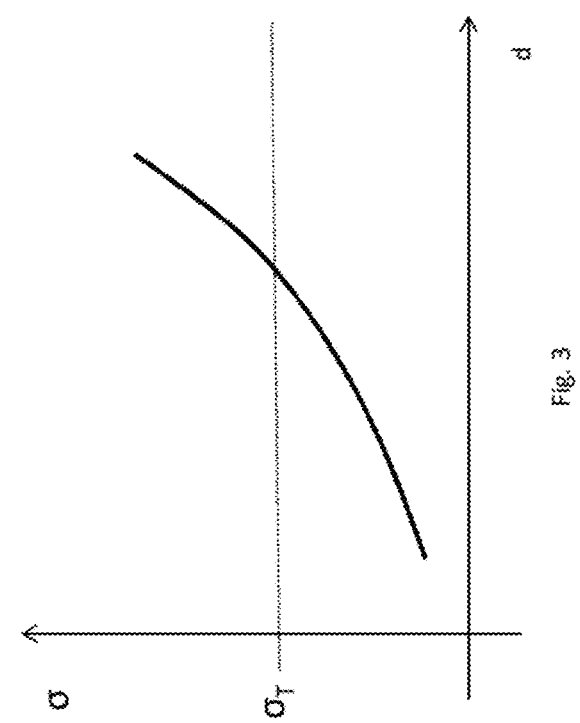
FIG. 1 is a graph representing a plurality of Gaussian distribution of data having a different standard deviation.

Since as can be seen from FIG. 3, the standard deviation also depends on the distance, the number of measurements N, and therefore the size of the memory 15, also depend on the distance d of the target object O. Therefore, as the distance of the target object O varies, in order to keep the same standard deviation target for the average of the N measurements when the distance d of the target object O has changed over time, it could preferably be necessary to modify N. Preferably, the size of the memory 15 is equal to or greater than the maximum value of the number N, $N_{max}$, used in the normal operation of the sensor 1.

In particular, in an embodiment, the standard deviation varies with the distance proportionally to the square of the latter $\sigma(d) \propto d^2$. In a preferred embodiment it was found that an experimental relationship between the standard deviation and the distance is given by the regression curve $Y = w*X^2 + r*X + q$ where w=1.4 E-8, r=-1.2 E-4, q=5.4 E-1, X=distance in mm.

Figure 4:
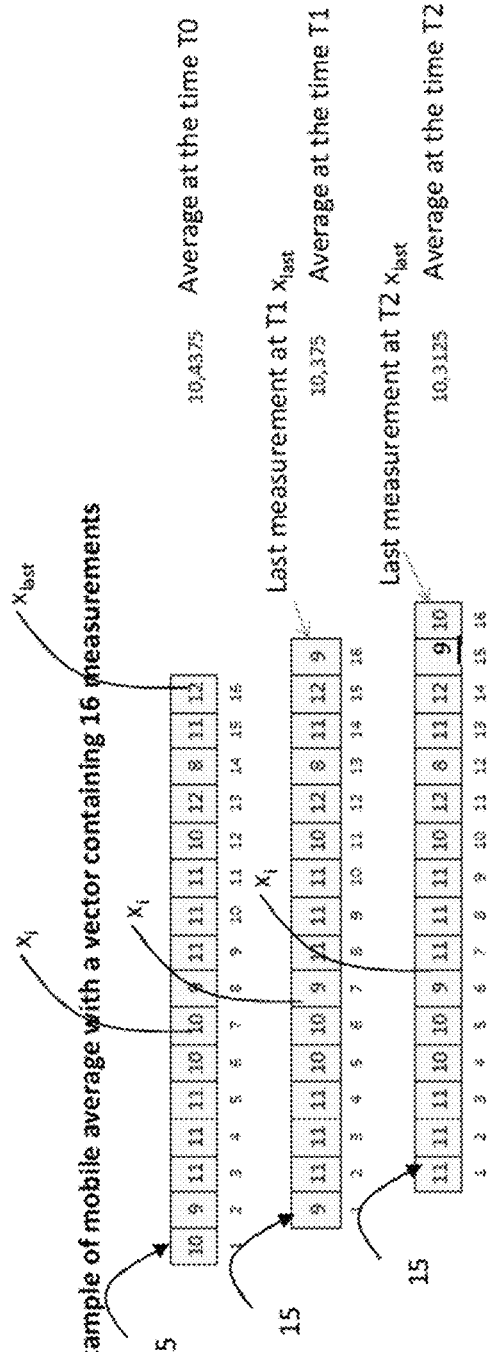
FIG. 4 is a diagram of a step of the method according to the invention.

As can be seen in FIG. 4, the memory 15 can preferably be considered a vector $V\{x_1 \ldots x_{last}\}$ of N measurements ordered in time sequence, in other words the memory 15 includes at least N cells each of which includes a distance measurement in output from the measuring circuit 11 and the cell are ordered in time. At the k-th time there is a certain vector $V_k$ including N measurements identified with $x_1$, $x_2 \ldots x_N = x_{last}$ in time sequence from the "oldest" to the most recent. At the k+1-th time, when a new measurement $x_k$ of distance d is carried out by the measuring circuit 11, the vector of the measurements modifies: the measurement carried out at the k+1-th time becomes the last measurement $x_{last}$ of the new vector $V_{k+1}$ from which the first measurement (the previous one $x_1$), the oldest in terms of time, is removed. The first measurement of the vector $V_{k+1}$ is now the measurement $x_2$.

In other words, for each successive time interval, there is an update of the memory 15 since a new measurement is saved there. This preferably means a modification of the vector V the first and last element of which has been modified. This modification of the first and last element of the vector V repeats at each successive time interval until the sensor is turned off or the measurement is interrupted.

The memory 15, that is preferably the vector V, is filled after N time intervals from the start of the operation of the sensor 1. Before N time intervals have passed, some cells are still empty. However, the method and the sensor of the invention also operates in a transient phase before the vector V is complete with N data, calculating a partial average, as detailed hereafter. In the block diagram of FIG. 7, the acquisition of the measurements $x_k$ and the preferable storage of at least N thereof, for example in the memory 15 in the form of a vector V, are two steps respectively identified as 1f and 2f.

At the k-th time, an average distance of the N measurements, called first average distance $\mu_N$, is thus calculated. Preferably, such a first average distance is an arithmetic average and includes the last measurement in chronological order carried out at the instant considered, which is indicated in FIG. 4 as $x_{last}$. The calculation of the first average distance is preferably carried out by the first processor circuit 8a of the sensor 1, which emits the value of the first average distance as output, preferably as input to the third processor circuit 9. Again in FIG. 4, in which the value of N is equal to 16, three vectors V of memory and three values of the first average distance for N=16 are indicated in three different rows for three consecutive time intervals called T0, T1 and T2.

Figure 7:
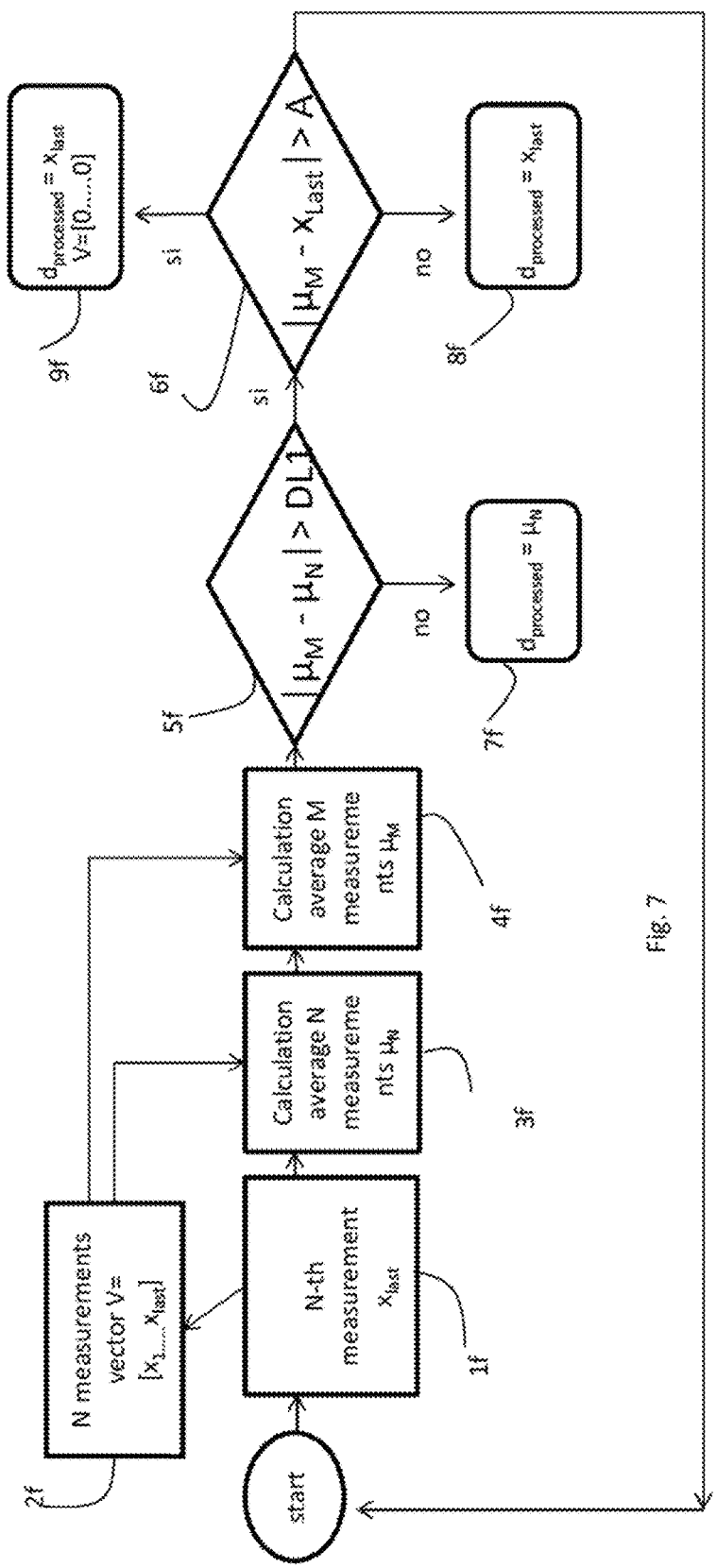
FIG. 7 is a block diagram of a preferred example of the method of the invention in which some steps are omitted for the sake of clarity.

The calculation of the first average $\mu_N$ is indicated with 3f in the block diagram of FIG. 7.

In the case in which the memory is not yet occupied by N measurements, but there are less, preferably until N measurements are reached partial averages are taken over the values available in memory.

Advantageously, a subset of the N consecutive measurements taken containing M measurements is then selected. The M measurements, preferably being a subset of the N measurements keeping the order of the latter, also follow one after the other and include the last measurement acquired in time $x_{last}$.

According to the invention, a second average distance $\mu_M$ is calculated, for example through the second processor circuit 8b of the sensor 1, in this case the average of the M measurements. Preferably, such an average $\mu_M$ is an arithmetic average. This calculation step of the second average is represented by the block 4f of the block diagram of FIG. 7.

Preferably, this second average distance is calculated by the second processor circuit 8b.

From a comparison of the first and of the second average distance, or from a comparison of a value function of the first average distance and a value function of the second average distance, the two functions not necessarily having to be the same, the type of output of the sensor is established as value of the processed distance of the target object O, in other words an improved value, either in terms of precision or response time or both, with respect to the value of the distance measurement d obtained in output through the measuring circuit 11.

The comparison is carried out by the first comparing circuit 20.

The value of the processed distance $d_{processed}$ emitted as output by the sensor 1 and by the method of the invention depends on whether the target object O is moving (as displayed for example in FIG. 2) or stationary (as in FIG. 8).

Figure 5:
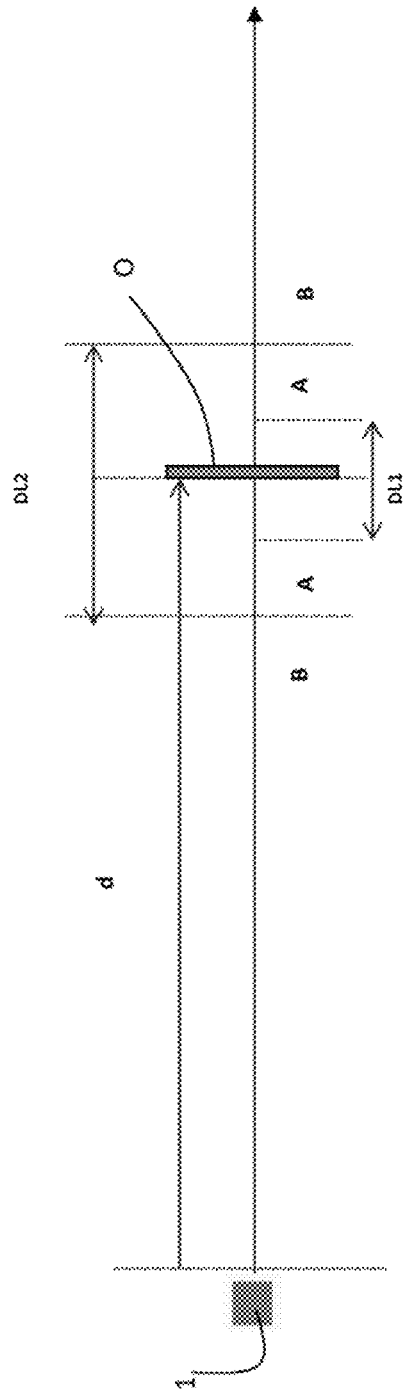
FIG. 5 is a diagram of a further step of the method according to the invention.

With reference to FIG. 5, the sensor 1 and the target object O are represented separated by a distance d. What has been exemplified now also applies to the case in which the distance d measured is not that between the sensor 1 and the target object, but between the target object O and a predetermined reference point.

The following intervals are preferably defined in relation to the target object O:
DL1=defines the interval in which the target object O is considered to be stationary;

A=defines the interval in which the target object is considered to probably be moving slowly; and B=defines the interval in which the target object is considered to definitely be moving.

If the aforementioned difference between the first and the second average distance, or between a value function of the first average distance and a value function of the second average distance, falls in modulus within DL1, the value provided in output is $V_{out}=d_{processed}=l(\mu_N)$, where l is a function of the first average. Preferably, the value provided in output is $V_{out}=d_{processed}=\mu_N$. In other words, if the difference between the first and the second average distance falls within DL1, the value of the processed distance is preferably equal to the average distance of the N measurements, in this way ensuring better repeatability, since the first average distance has a relatively low error.

The comparison between the difference calculated by the comparing circuit 20 and the value DL1, called first threshold, as well as the consequent output of the processed distance value of the sensor, is preferably carried out by the third processor circuit 9 of the sensor 1.

This comparison between the two averages or between value functions of the first and of the second average is indicated with 5*f* in the block diagram of FIG. 7. As stated above, in the case in which the difference does not exceed DL1, therefore the block 5*f* receives a negative response, the output of the sensor or of the method of the invention is preferably equal to the average value of the N distance measurements, as highlighted in block 7*f*.

Figure 6:
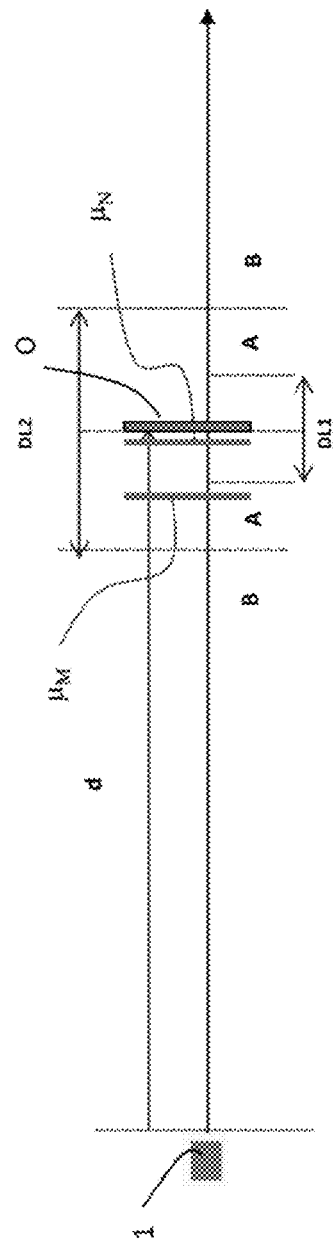
FIG. 6 is a diagram of yet a further step of the method of the invention.

This situation in which the difference between the first and the second average distance is in modulus within DL1, also includes the case in which $\mu_M$ is outside of DL1, as represented in FIG. 6.

Otherwise, in a preferred aspect of the invention, if the difference exceeds DL1, the average value $\mu_M$ is compared with the last single distance measurement carried out $x_{Last}$, or a value function of the first average distance and a value function of the last distance measurement carried out are compared, calculating their difference. If the absolute value of the difference is within what is indicated as interval A in FIG. 5, it means that the target object is moving slowly, or that the fact that the first difference was greater than DL1 could be due to the presence of a statistical oscillation. In this case, the output of the sensor 1 or of the method of the invention is the last single acquired measurement value, $V_{out}=d_{processed}=x_{Last}$, but the remaining measurements are not erased from the memory. In other words, preferably the memory still has the values of the N measurements, for example the vector $V_k=[x_1, x_2, \ldots x_N=x_{last}]$ remains stored.

In this way preferably a better promptness of the sensor and of the method is obtained with respect to the case in which the value of the first average distance is provided as output, or as processed distance. As stated above, preferably it is wished for the first average distance to have a standard deviation value equal to or less than the predetermined standard deviation target. Therefore, if the object were really moving, the initial precision is obtained again after $N_{max}$ measurements and therefore this would enormously increase the response times of the sensor. The standard deviation target therefore is not considered and therefore a plurality of successive measurements are not waited for, so as to obtain a first average distance with standard deviation below the standard deviation target, but as soon as it has been detected that the first threshold DL1 has been exceeded, the last measurement carried out is emitted as output. The response time of the sensor and of the method is therefore particularly increased. There is worse instantaneous repeatability, but by not erasing the previous measurements, there is the possibility of recovery of the history so as to re-establish repeatability in the case of a return to the hypothesis of a stationary target object. In other words, if in one of the successive measurements the difference between the first and the second average distance falls within DL1, the values of the measurements in memory are recovered, immediately going back to the precision/repeatability prior to leaving DL1 since the following output value of processed distance is an average distance of N measurements.

In order to verify whether the difference between the second average $\mu_M$ and the last distance measurement $x_{last}$ is within A, two differences are calculated and they are compared with two distinct threshold values. The first difference is already obtained, is the difference of the first and of the second average that is compared in modulus with DL1 and it outside DL1, and the second difference is between the second average distance and the last distance measurement carried out (or between a value function of the second average distance and a value function of the last distance measurement carried out, with functions not necessarily the same) and it is compared with a second threshold value indicated with DL2. If this second difference is smaller in modulus than DL2, then it is in the interval A indicated in FIG. 5.

This comparison and calculation of the difference between the second average $\mu_M$ and the last distance measurement carried out $x_{last}$ is preferably carried out by the second comparator circuit 21. Preferably, the second comparator circuit 21 is part of the third processor circuit 9. Furthermore, the comparison of this second difference with the threshold DL2 is preferably carried out by the third processor circuit 9, which also emits the output of the processed distance equal to the last distance measurement carried out.

This step of determining the second difference and of comparing it with the second threshold DL2 is globally indicated with 6*f* in FIG. 7. The output $d_{processed}=x_{last}$ in the case of negation of the comparison according to block 7*f* is given in block 8*f*.

If the absolute value of the second difference is also outside of A, i.e., the second threshold DL2 is also exceeded by the second difference, it is in the interval indicated with B in FIG. 5, and this means that the target object has moved "a lot". Therefore, preferably the output of the sensor and of the method of the invention, i.e., the processed distance, is equal to the last single distance measurement acquired, $V_{out}=d_{processed}=x_{Last}$. Furthermore, since the new distance of the target object O is not correlated with the previous distance, preferably the series of measurements in memory 15 is erased, setting V=[0]. This erasing us due to the fact that at this point the target object could have stopped or still be moving, so the process goes back to the start of the procedure and it begins to accumulate samples again. This ensures better promptness, i.e., also in this case there is no waiting for a standard deviation to be reached below a target, but at the expense of worse repeatability.

This emission of the output and the erasing of the memory are indicated in block 9*f* of FIG. 7.

Preferably, the two thresholds DL1 and DL2 identifying the intervals A and B in the figures are given by:

$$DL1(d) \cong 2\sigma_N(d)\sqrt{N/M}+K$$

$$DL2(d)=4*DL1(d).$$

Preferably, at the next time k+1, a new measurement is carried out by the measuring circuit 11.

It is then preferably verified whether the standard deviation of the average is kept below or equal to the standard deviation target. If this were not the case the number of N is modified, increasing it. In reality, since σ(d) is tabulated in memory (according to the experimental relationship seen above), at the measurement k+1, DL1, DL2 and N are recalculated.

Therefore, a new measurement is inserted in the memory and a new value of last measurement is present. The values of the first and of the second average are then recalculated. Since the process repeats at each successive time interval, the first and the second average are actually mobile averages truncated as a predetermined value.

EXAMPLE

A time of flight sensor was selected and the following values were set:

M=3

$N_{MAX}$=32

$\sigma_N$(d=20 m)=1.6 mm=$\sigma_T$ is the standard deviation target, the following formula is thus used N(d)=[σ(d)/$\sigma_T$]^2 from which DL1=±5 mm; DL2=±20 mm per d=0.2 m DL1=±14 mm; DL2=±56 mm per d=20 m In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A distance sensor to calculate distances of a target object without contact, the distance sensor comprising:
   a contactless measuring circuit that outputs a signal proportional to a distance between said target object and the distance sensor, the signal corresponding to a measurement of the distance of said target object without contact;
   a first processor circuit communicatively coupled to receive and process said output signals from said measuring circuit, to calculate a first average distance from said target object based on an average of a number N of distance measurements of the signals from said measuring circuit, said number of N distance measurements being consecutive in time and including a last distance measurement outputted by said measuring circuit in a period of time;
   a second processor circuit communicatively coupled to receive and process said output signals from said measuring circuit, to calculate a second average distance from said target object based on an average of a number M of distance measurements of the signals from said measuring circuit, said number M of distance measurements being a subset with the number M less than the number N of said number N of distance measurements, consecutive in time and including the last distance measurement outputted by said measuring circuit in the period of time;
   a first comparator circuit communicatively coupled to receive and calculate a first difference between a function value of said first average distance and a function value of said second average distance; and
   a third processor circuit communicatively coupled to receive and compare said first difference with a first threshold and to provide as an output of the distance sensor a processed distance value, said processed distance value being equal to a value function of said first average distance if said first difference is less than or equal to said first threshold, or otherwise being equal to a value function of said last distance measurement outputted by said measuring circuit.

2. The distance sensor according to claim 1, further comprising: a memory that stores at least a number $N_{MAX}$ of said measurements, where the number $N_{MAX}$ is greater than or equal to the number N, received from said measuring circuit after one another in time.

3. The distance sensor according to claim 2, further comprising:
   a second comparator circuit communicatively coupled to receive and calculate a second difference between a value function of said second average distance and a value function of said last distance measurement if said first difference is greater than said first threshold.

4. The distance sensor according to claim 3, wherein said third processor circuit is communicatively coupled to receive and compare said second difference with a second threshold and provide as an output a processed distance value equal to a value function of said last distance measurement if said second difference is greater than said second threshold, said second threshold being greater than said first threshold, and for erasing said number N of distance measurements stored in said memory.

5. The distance sensor according to claim 3, wherein said third processor circuit is communicatively coupled to receive and compare said second difference with a second threshold and provides as an output a processed distance value equal to a value function of said last distance measurement if said first difference is greater than said first threshold and said second difference is less than or equal to said second threshold, said second threshold greater than said first threshold, and to maintain said number N of distance measurements stored in said memory unchanged.

6. The distance sensor according to claim 2, wherein said memory is a Last-In-First-Out memory.

7. The distance sensor according to claim 1, wherein at least one of said first threshold and said second threshold is a function of the distance of said target object.

8. The distance sensor according to claim 1, wherein at least one of said first threshold and said second threshold is a function of a standard deviation of said first and/or said second average distance.

9. The distance sensor according to claim 1, wherein said first or said third processor circuit communicatively coupled to calculate a standard deviation of said first average distance and compare said standard deviation of said first average distance with a standard deviation target, a value of said number N selected so that said standard deviation of said first average distance is less than or equal to said standard deviation target.

10. The distance sensor according to claim 1, wherein said sensor is a time-of-flight sensor.

11. The distance sensor according to claim 1 wherein at least one of said first processor circuit, said second processor circuit, and said third processor circuit are part of an integrated circuit.

12. A machine-implemented method of processing distance measurements of a target object without contact at the k-th time, the method comprising:
   obtaining, from a distance measuring circuit coupled to a non-contact distance sensor, a plurality of measurements of distance of said target object to the non-contact distance sensor, the plurality of measurements corresponding to a plurality of successive time intervals;

calculating a first average distance of the number N of distance measurements of said target object, said number N of distance measurements following one after the other and including the last distance measurement carried out at the i-th time;

calculating a second average distance of a number M of distance measurements of said target object, said number M of distance measurements being a subset of said number N of distance measurements with the number M being less than the number N, following one after the other and including the last distance measurement carried out at the i-th time;

determining a first difference between a function value of the first average distance and a function value of the second average distance;

comparing said first difference with a first threshold; and providing an output as a processed distance value of said target object to the distance sensor, a process distance value corresponding to a value function of said first average distance if said first difference is less than or equal to said first threshold, and the process distance value otherwise corresponding to a value function of said last distance measurement.

13. The method according to claim 12, further comprising:

pre-setting a standard deviation target value of said first average distance of the number N of distance measurements; and selecting a value of the number N of distance measurements to obtain a value of a standard deviation of said first average distance equal to or less than said standard deviation target.

14. The method according to claim 12, further comprising:

calculating a second difference between a function value of said second average distance and a value function of said last distance measurement if said first difference is greater than said first threshold.

15. The method according to claim 14, including:

storing at least the number N of distance measurements consecutive in time;

comparing said second difference with a second threshold;

providing as output the processed distance value of said target object, the processed distance value corresponding to a value function of said last distance measurement if said second difference is greater than said second threshold, said second threshold being greater than said first threshold; and erasing said number N of distance measurements which had been stored.

16. The method according to claim 14, further comprising:

storing at least the number N of distance measurements consecutive in time;

comparing said second difference with a second threshold;

providing as an output the processed distance value of said target object, the processed distance value corresponding to a value function of said last distance measurement if said first difference is greater than said first threshold and said second difference is less than or equal to said second threshold, said second threshold being greater than said first threshold, and keeping as unchanged said number N of distance measurements which had been stored.

17. The method according to claim 12, further comprising:

varying at least one of said first threshold and said second threshold as a function of said distance.

18. The method according to claim 12, further comprising:

varying at least one of said first threshold and said second threshold as a function of the value of said number N of distance measurements.

19. The method according to claim 12, further comprising:

updating the values of said first and second average distance, of said first and second difference and of said processed distance at the time interval k+1 after the time interval k.

20. A distance sensor to calculate distances of a target object without contact, the distance sensor comprising:

a contactless measuring circuit that obtains a plurality of measurements, without contact, of the distance of said target object at a plurality of time intervals, and in response generates a number of output signals that provide values representative of the measurements of distance to said target object;

a first processor circuit communicatively coupled to receive and process said output signals from said measuring circuit, to calculate a first average distance from said target object based on an average of a number N of distance measurements in output signals from said measuring circuit, said number of N distance measurements being consecutive in time and including a last distance measurement obtained by said measuring circuit in a period of time;

a second processor circuit communicatively coupled to receive and process said output signals from said measuring circuit, to calculate a second average distance from said target object based on an average of a number M of distance measurements in output from said measuring circuit, said number M of distance measurements being a subset with the number M less than the number N of said number N of distance measurements, consecutive in time and including the last distance measurement obtained by said measuring circuit in the period of time;

a first comparator circuit communicatively coupled to receive and calculate a first difference between a function value of said first average distance and a function value of said second average distance; and a third processor circuit communicatively coupled to receive and compare said first difference with a first threshold and to provide as an output of the distance sensor a processed distance value, said processed distance value being equal to a value function of said first average distance if said first difference is less than or equal to said first threshold, and the processed distance value otherwise being equal to a value function of said last distance measurement obtained by said measuring circuit.

* * * * *